3,298,846
REDUCING ACIDITY OF POLYMER LATICES
Neville Leverne Cull, Baker, La., and Murray Nadler, Morristown, N.J., assignors to Esso Research and Engineering Company, Wilmington, Del., a corporation of Delaware
No Drawing. Filed June 14, 1963, Ser. No. 287,790
7 Claims. (Cl. 106—287)

This invention relates to the preparation of latices from oxidized liquid diolefin polymers and more particularly relates to a method for controlling the acidity of such latices during the solvent removing step.

It is known to prepare latices of air-blown polymers of conjugated diolefins. Such latices are prepared by emulsifying hydrocarbon solutions of air-blown liquid diolefin polymer with a suitable emulsifier and removing the solvent. Unfortunately, however, the acids present in the air-blown polymer cause difficulty during the solvent removal step, particularly under continuous stripping conditions, where the bulk of the latex is recycled through the stripper. These are two-fold. In the first place, the acids cause corrosion of the steel equipment used in removing the solvent from the polymer. Secondly, the presence of the acids causes hydrolysis of the emulsifier at the high temperature obtained during the solvent removal step, resulting in latex instability with the concurrent formation of undesirable amounts of coagulum.

It has now been found that these difficulties can be overcome and the stability of the latices maintained during the solvent removal step by controlling the pH of the latex at levels higher than 3.0

The latices to which this invention is directed are prepared from air-blown liquid polymers of conjugated diolefins having 4 to 6 carbon atoms per molecule, such as butadiene, isoprene, dimethyl butadiene, propylene, and methyl pentadiene. The polymer may be a homopolymer or a copolymer of such a diolefin and vinyl aromatic hydrocarbon such as styrene, methyl styrene, ethyl styrene and the like. These liquid polymers may be prepared by mass polymerization or other suitable means. A particularly suitable polymer is prepared by copolymerizing 100 to 50 parts of butadiene-1,3 and 0 to 50 parts of styrene with sodium as described in U.S. Patent No. 2,791,618 (1957) to J. E. Moise et al., but the practice of the invention is not limited to products prepared by this method. In general these polymers have molecular weights of about 300 to about 5000 having viscosities of about 0.2 to 2 stokes at 50% NVM in Varsol.

The liquid polymers, prepared as described above, are oxidized by blowing with air or oxygen in the presence of an aromatic hydrocarbon solvent, particularly one having a Kauri-butanol value of at least 40 as described in U.S. Patent No. 2,950,333 to D. F. Koenecke. Products having up to 20% oxygen can be prepared in this manner. More specifically the liquid polymer oil is oxidized by blowing in the presence of an organic salt of cobalt, lead, iron, or manganese as a catalyst at a temperature between 70 and 300° F. The polymer is preferably dissolved in an aromatic hydrocarbon solvent such as those boiling up to about 500° F., preferably between 170 and 400° F., e.g., benzene, toluene, hemimellitene, pseudocumene, mesitylene, propyl benzene, cymene, ethyl toluene, methyl ethyl benzene, xylenes, Solvesso 100 (a mixture of aromatic hydrocarbons boiling 300 to 350° F.), Solvesso 150 (a mixture of aromatic hydrocarbons boiling 335 to 410° F.) or mixtures, thereof. Mixtures of these with aliphatic hydrocarbons, such as Varsol, which is a straight-run mineral spirit boiling 285 to 400° F. and having an aromatic hydrocarbon content of 5 to 35 wt. percent are also suitable. The process can be carried out in an open kettle, a packed tower, or the like. The percent of oxygen in the product will vary according to the conditions of time and temperature from a trace to 20% or more.

Latices are prepared from the oxidized polymer by emulsifying a solution of the oxidized polymer in an aromatic hydrocarbon, e.g., benzene in water containing an emulsifier and stripping the solvent from the resulting emulsion leaving the polymer dispersed in water as the desired latex. Since it is desirable to prepare the latex from a solution of the oxidized polymer in a solvent which volatilizes at a lower temperature than water or which easily forms an azeotrope with it, it is preferable to carry out the oxidation in such a solvent so that there will be no need for solvent replacement. For this reason benzene or a similar solvent is preferred as the oxidation solvent. Although any emulsifier which will yield an emulsion may be used, a particularly suitable latex which is initially stable remains so at the temperature required to remove the solvent and which is also stable to pigment dispersions is prepared by the use of a fatty alcohol sulfate having the formula $MRSO_4$ where M is sodium, potassium, ammonium, methanolamine, or diethanolamine and R is lauryl, oleyl, cetyl or their ethoxylated derivatives. Two to five parts of emulsifier per hundred parts by weight of polymer solids are generally sufficient. In preparing the emulsion, the polymer solution is added slowly to the water-emulsifier solution and blended with vigorous agitation of the mixture for 10–60 minutes, preferably 30–60 minutes. The hydrocarbon is then distilled from the latex under vacuum so that the final latex contains less than 1% of solvent.

The latices thus produced contain about 40 to 60% by weight of total solids. Typical samples have the following properties:

| | |
|---|---|
| NVM | 45–55 wt. percent. |
| Emulsifier | 1.7–5 phr. (parts per 100 parts of polymer solids). |
| Brookfield visc. (cps.) | 100–600. |
| pH | 2–3. |
| Residual solvent | 0.7–1. |
| Stability | Does not separate in six weeks. |

A latex having the above characteristics in shelf stable, stable under temperature conditions necessary to remove the solvent and is compatible with various pigment dispersions. However, the pH of the crude latex of polymer, solvent and water is usually very low and causes corrosion of the metal equipment used in stripping the solvent from the latex. Furthermore, the emulsifier itself easily hydrolyzes under the low pH conditions and loses its effectiveness causing a large portion of the polymer to coagulate and thus be lost, particularly under continuous stripping conditions.

In accordance with the present invention these difficulties can be avoided by maintaining the pH of the crude latex above 3.0 during the stripping operation. This control of the pH can be accomplished by adding sufficient amounts of a pH-controlling material such as caustic or buffering agents to the crude latex to increase the pH to 3.0 or above. The amount of caustic or buffering agent necessary to accomplish this will depend on the specific buffering agent used, on the acidity of the original polymer used and on the exact pH desired during stripping. When caustic is used as the additive, the amount must be kept below 0.4 part by weight per 100 parts of oxidized polymer. When buffer salts are used care must be taken to use as little as possible since too much of these salts markedly decreases the water resistance of coatings prepared from the stripped latex. Any suitable buffering agent may be used, but the following have been found acceptable: sodium acetate, lithium acetate and sodium borate. The pH-controlling material may be added to the raw latex or to the emulsifier prior to emulsification. The pH of the stripped latex can be increased further without increasing the amount of additive by pretreating the solution of polymer in hydrocarbon solvent (cement) with an ion exchange resin or with an alkali metal carbonate followed by filtering. Such a pretreated cement when made into a latex as described above and then stripped in the presence of a buffer salt yields a latex of about 4.0 for the same amount of salt. Carbonates which can be used for this purpose include sodium, potassium, lithium, rubidium, cesium and ammonium.

The advantages of this invention will be better understood from a consideration of the following experimental data which are given for the sake of illustration, but without intention of limiting the invention thereto.

*Example 1*

A butadiene-styrene polymer oil was prepared from the following charge:

| | Parts by wt. |
|---|---|
| Butadiene-1,3 | 80 |
| Styrene | 20 |
| Mineral spirits | 200 |
| Dioxane | 40 |
| Isopropanol | 0.2 |
| Sodium (10 to 50 microns) | 1.5 |

The polymerization of this charge was carried out at 50° C. in a five-stage commercial unit. The resultant product had a viscosity of 1.5 stokes at 50% NVM in Varsol solution.

This polymer was dissolved in benzene to make a 35% NVM solution and blown with air at about 270° F. until the oxygen content reached about 10% (based on polymer). The oxidized polymer was filtered and diluted with benzene to give about a 25% NVM solution. The polymer solution was emulsified by adding it slowly to water containing 3 phr. of sodium lauryl sulfate as emulsifier. To the water emulsifier solution had been added small amounts of caustic or salts capable of buffering action. The cement (hydrocarbon and polymer) and the water-emulsifier solution (containing caustic or salts capable of acting as buffers) were vigorously agitated for 60 minutes using a Premier Dispersator. A 70/30 volume ratio of cement/water was used in all these preparations. The resulting raw latex was then stripped at atmospheric pressure to remove the bulk of the benzene. The final stripping to reduce the solvent to a low level and to concentrate the latex to 45–55% solids was carried out under vacuum (18–20″ Hg). The finished latex was inspected for solids content, pH, and emulsifier content. The following data were obtained:

| Run No | 1 | 2 | 3 | 4 | 5 | 6 |
|---|---|---|---|---|---|---|
| Additive | 0 | A | B | C | D | E |
| Stripped latex: | | | | | | |
| NVM | 47.5 | 44.2 | (¹) | 49.0 | 45.6 | 47.6 |
| pH | 2.7 | 3.3 | (¹) | 3.6 | 3.4 | 3.0 |
| Emulsifier, phr | 1.7 | 2.3 | (¹) | 2.5 | 2.8 | 2.9 |
| Percent emulsifier lost | 42 | 23.0 | | 16 | 7.0 | 3.0 |

A=Li(Ac)(0.3 phr.), B=NaOH(0.5 phr.), C=NaOH(0.3 phr.), D= Na₂B₄O₇(0.3 phr.), E=Na(Ac)(0.15 phr.).
¹ Latex coagulated.

The above data show that the pH of the latex can be maintained at or above 3.0 during stripping without any substantial loss of emulsifier and hence loss of polymer by coagulation. Furthermore, corrosion of equipment was markedly reduced.

*Example 2*

A sample of the polymer of Example 1 was oxidized in benzene to an oxygen content of approximately 10% based on polymer. The acid number (polymer basis) was 28. The oxidized polymer was further diluted with benzene to a solids content of 26.8 and passed over an anionic exchange resin (converted to the hydroxyl form by treatment with 10 wt. percent NaOH) at about 1 volume of cement per volume of ion exchange resin per hour. After treatment the cement was found to have an acid number of 18. This cement was converted into a latex with 3 phr. of sodium lauryl sulfate to which 0.3 phr. of Na₂B₄O₇ had been added. This latex was stripped to 43.7 wt. percent NVM and compared with the inspections of the raw latex. The following data were obtained:

| | Raw Latex | Stripped Latex |
|---|---|---|
| NVM, wt. percent | 18.2 | 43.7 |
| pH | 5.7 | 4.2 |
| Viscosity, cps | 250 | 200 |
| Emulsifier, phr | 3.0 | 2.9 |
| Percent emulsifier lost | | 3.3 |

The above data show that a stable latex at high pH (above 4) can be prepared by a combination of pretreating the cement and buffering the latex during stripping. When a similar latex was prepared and adjusted to a pH between 4–6 by caustic without pretreating the cement, the latex coagulated heavily upon stripping.

In summary, therefore, it has been found that latices having excellent thermal stability can be prepared by emulsifying hydrocarbon solutions of oxidized liquid diolefin polymers with 2–5 phr. of an alkali metal salt of fatty alcohol sulfates, adding a sufficient amount of caustic or a buffer salt, e.g., the alkali metal salt of weak acids such as sodium borate, sodium acetate and lithium acetate to the polymer latex and removing the solvent so as to produce a solvent-free latex having a pH above 3.0. Even higher pH can be obtained by preliminarily treating the polymer solution with alkali metal carbonates or ion exchange resins before preparing the latex and then stripping the solvent in the presence of the buffer salt.

The nature of the present invention having been thus fully set forth and specific examples of the same given, what is claimed as new and useful and desired to be secured by Letters Patent is:

1. In a method for preparing a thermally stable latex from an air-blown liquid polymer of a conjugated diolefin of 4 to 6 carbon atoms in which a solution of said oxidized polymer is agitated with water in the presence of 2 to 5 parts by weight of an emulsifier per 100 parts by weight of oxidized polymer, said emulsifier having the formula MRSO₄ where M is selected from the group consisting of sodium, potassium, ammonium, triethanolamine and diethanolamine and R is selected from the group consisting of lauryl, cetyl, oleyl and ethoxylated derivatives thereof, and from which the solvent is removed to form a finished latex containing about 40 to 60 wt. percent of total solids, the improvement which comprises adding to said latex before said solvent is removed a sufficient amount of a pH-controlling material chosen from the group consisting of sodium hydroxide, sodium acetate, lithium acetate and sodium borate to form a stable latex having a pH of at least 3 after the solvent has been removed said sodium hydroxide being added in amounts below 0.4 wt. percent and said other salts being added in as small amounts as possible.

2. The process as in claim 1 where the pH-controlling material is mixed with the emulsifier prior to emulsification.

3. The process of claim 1 in which the pH-controlling material is sodium hydroxide.

4. The process of claim 1 in which the pH-controlling material is sodium acetate.

5. The process of claim 1 in which the pH-controlling material is lithium acetate.

6. The process of claim 1 in which the pH-controlling material is sodium borate.

7. The process of claim 1 in which the solution of oxidized polymer is treated, prior to emulsification, with a material chosen from the group consisting of ion exchange resin, sodium carbonate, potassium carbonate, lithium carbonate, rubidium carbonate, cesium carbonate and ammonium carbonate.

References Cited by the Examiner

UNITED STATES PATENTS

| | | | |
|---|---|---|---|
| 2,430,400 | 11/1947 | Hoelscher | 252—312 |
| 2,799,662 | 7/1957 | Ernst et al. | 260—29.7 |
| 2,908,585 | 10/1959 | Koenecke | 106—287 |
| 3,133,946 | 5/1964 | Maurer et al. | 252—312 |
| 3,232,900 | 2/1966 | Cull et al. | 260—29.7 |

MORRIS LIEBMAN, *Primary Examiner.*

ALAN LIEBERMAN, *Examiner.*